United States Patent Office 2,826,555
Patented Mar. 11, 1958

2,826,555

MANUFACTURE OF ALUMINA-PLATINUM CATALYSTS

Marvin A. Smith, Shreveport, La., assignor, by mesne assignments, to Universal Oil Products Company, Des Plaines, Ill., a corporation of Delaware No Drawing. Application November 24, 1953
Serial No. 394,191

1 Claim. (Cl. 252—466)

The present invention relates to the preparation of a catalyst which is particularly applicable to the conversion of hydrocarbons and to processes wherein cracking or splitting of carbon to carbon bonds is to be minimized or controlled at a predetermined low level. Examples of the first type of conversion include primarily dehydrogenation reactions as, for example, the dehydrogenation of a normally gaseous or normally liquid fraction, or mixtures thereof, to form the corresponding unsaturated hydrocarbon. Another example of reactions of the first type includes dehydrocyclization reactions in which a straight chain paraffinic hydrocarbon containing more than six carbon atoms is cyclized to form the corresponding aromatic hydrocarbon. Still another reaction of this class is hydrogenation in which unsaturated compounds are hydrogenated to the corresponding saturated compound as, for example, the hydrogenation of an olefin to the corresponding paraffin. While the catalyst is particularly applicable to the treatment of hydrocarbons, it is understood that the catalyst may be used for the conversion of other organic compounds such as alcohols, ketones, esters, ethers, etc. and particularly the unsaturated compounds thereof to convert the same by hydrogenation to the corresponding saturated compounds, and the conversion of the saturated compounds by dehydrogenation to the corresponding unsaturated compounds.

An example of the conversion reaction of the second type in which a controlled amount of cracking is desired is the reforming process. In the reforming process a gasoline of full boiling range or any selected fraction thereof is converted to a reformate of improved antiknock characteristics. In this process the desired reactions include dehydrogenation, cyclization, isomerization, hydrogen transfer, etc. and a controlled amount of cracking. The cracking must be controlled both in quantity and in quality. Excessive cracking results in the production of normally gaseous products which cannot be used in the reformate and, therefore, results in lower reformate yields. On the other hand the quality of cracking must be such that $C_5$ and higher molecular weight hydrocarbons are formed in order that the cracked products will be within the gasoline boiling range. Excessive cracking also means higher carbon formation on the catalyst which tends to deactivate the catalyst and requires more frequent regeneration or replacement. It is thus seen that controlled cracking is desirable because it results in a gasoline of higher volatility and also of improved antiknock characteristics.

In one embodiment the present invention relates to a method of preparing a catalyst which comprises oxidizing a platinum compound with an oxidizing agent, compositing the resultant material with alumina, and calcining the composite at a temperature of from about 500° F. to about 1200° F.

In a specific embodiment the present invention relates to a method of manufacturing a catalyst which comprises compositing fluorine with alumina by commingling an aqueous solution of hydrogen fluoride with alumina, separately commingling a platinum compound and an oxidizing agent in an aqueous solution, removing any excess oxidizing agent, compositing the resultant material with the separately formed mixture of alumina and halogen and calcining the composite at a temperature of from about 500° F. to about 1200° F.

In another embodiment the catalyst may contain a halogen which preferably is present in an amount of from about 0.1% to about 8% by weight of the catalyst. When the halogen comprises fluorine, it preferably is present in a concentration of from about 0.1% to about 3% by weight of the catalyst, and when the halogen comprises chlorine, it preferably is present in a concentration of from about 0.1% to about 8% by weight of the catalyst. Bromine or iodine may also be utilized but not necessarily with equivalent results.

In still another embodiment the halogen may comprise a mixture of two or more of the halogens, but the total amount thereof will be within the range hereinbefore set forth.

It will be noted that the catalysts of the present invention comprise platinum composited with alumina. The use of platinum-containing catalysts has been of limited commercial acceptance because of the high cost of the platinum. It has been found that especially good catalysts containing small amounts of platinum may be made in accordance with the present invention. The amount of platinum is generally within the range of from about 0.01% to about 1% by weight, although in some cases it may range up to about 10% by weight of the alumina. Further, in order to obtain the improved results with lower platinum concentrations, the other catalyst components must be carefully selected and it has been found that alumina shows unexpected advantages for use in the catalyst composite. The alumina apparently enters into some peculiar association either chemically or physically with the platinum. While it is believed that the platinum is in a combined state with the alumina, it is understood that the platinum, at least at some time during the preparation or use, may be present as free platinum and the use of the term "platinum" in the present specifications and claim is intended to include combined platinum and free platinum. While alumina is a preferred inorganic oxide base to use in accordance with the present invention, other alumina containing composites may be used such as alumina-silica, alumina-titania, alumina-zirconia, alumina-thoria, etc.

The catalyst of the present invention may be prepared in any suitable manner. While the alumina may comprise naturally occurring alumina, it preferably is precipitated in order that the alumina is free from undesirable impurities. Precipitated alumina may be readily prepared by adding a suitable reagent such as ammonium hydroxide, ammonium carbonate, etc. to a salt of aluminum such as aluminum chloride, aluminum nitrate, aluminum acetate, etc. in an amount to form aluminum hydroxide which upon drying is converted to alumina, and in the interest of simplicity the aluminum hydroxide is referred to as alumina in the present specification and claim, in order that the percentages are based on the alumina free of combined water. It has been found that aluminum chloride is generally preferred as the aluminum salt not only for convenience in subsequent washing and filtering procedures but also because it appears to give best results. It is understood that the aluminum chloride used in preparing the alumina will itself be free of these undesirable impurities so as not to transfer them to the final catalyst.

After the alumina has been formed, it is generally washed to remove soluble impurities. Usual washing procedures comprise washing with water either in combination with filtration or as separate steps. It has been found that the filtration of the alumina is improved when the wash water includes a small amount of ammonium hydroxide. The washed alumina while still in a wet state may be composited with the platinum or other catalytic components in the manner to be hereinafter set forth or the alumina may be dried, formed into particles of uniform or irregular size and shape and calcined prior to commingling with the platinum. Silica may be prepared by adding hydrochloric acid to commercial water glass to precipitate silica which is washed with acidulated water to remove sodium ions. The wet silica and alumina may be composited to form the alumina-silica composite which is then impregnated with a platinum compound in accordance with this invention. The alumina-silica composite may also be formed by coprecipitation or other well-known techniques.

The platinum for compositing with the alumina or alumina-containing composite is prepared in accordance with the following manner. A platinum compound is composited with an oxidizing agent to oxidize the platinum compound. The platinum compound may be in solution, preferably an aqueous solution, or the platinum compound may be in a dry state. The oxidizing agent may also be in a dry state or in a solution, and in some cases a gas such as oxygen or air may be used as the oxidizing agent. The oxidizing agent and platinum compound may be composited in any suitable manner. When an aqueous solution of the platinum compound is used, the oxidizing agent may be added in a dry state. It may be added as a solution, or in cases where the oxidizing agent selected is a gas, the gas may be bubbled through the solution. When the platinum compound is in a dry state, the oxidizing agent is preferably added as an aqueous solution and the platinum compound subsequently dissolved in the aqueous solution, however, it is also within the scope of this invention that the oxidizing agent and platinum compound be mixed as dry solids and the oxidizing agent decomposed upon further treatment, such as heating and/or dissolving in a suitable solvent and the platinum compound thereby oxidized. In the preferred embodiment the oxidizing is performed in an aqueous solution, that is, the oxidizing agent and/or platinum compound are in aqueous solution. The temperature of the oxidizing should be selected so that no undesirable reactions take place and likewise should be high enough so that the oxidizing is sufficient.

The time that the oxidizing agent and platinum compound remain in contact with each other depends upon the particular platinum compound and oxidizing agent used, however, the time is such that the oxidizing agent has sufficient time to substantially oxidize the platinum compound.

A particularly satisfactory method of impregnating the alumina or the alumina-containing composite comprises the use of an aqueous solution of chloroplatinic acid and the present specification will be directed to the use of chloroplatinic acid, however, it is to be understood that other platinum compounds containing halogen which are water soluble and form true solutions may be employed including ammonium platinum chloride, trimethylbenzyl ammonium platinum chloride, tetramino platino chloride, etc.

The oxidizing agent that is used may be a solid, liquid, solution and/or gas. As hereinbefore mentioned, the preferred oxidizing agents comprise either the dry oxidizing agents or solutions of the oxidizing agents, and preferably the oxidizing is performed in aqueous solution. Specifically, preferred oxidizing agents comprise the following compounds as well as their solutions: nitrates and peroxides, particularly ammonium nitrate and hydrogen peroxide. A solution of hydrogen peroxide and hydrochloric acid has proven to be a particularly effective solution for oxidizing chloroplatinic acid. The oxidizing agent that is chosen is selected so that an insoluble compound of platinum is not formed by its use at the conditions under which it is used. Nitric acid may be used as the oxidizing agent, and when it is selected, it is preferred that ammonium hydroxide be added to the final solution before impregnation to adjust the pH to between about 5 to about 10.

The amount of oxidizing agent that is employed should be such that after the oxidizing there is no excess of oxidizing agent present. Very small amounts of oxidizing agent are effective, however, it is preferred that the amount used be such that the platinum compound be substantially oxidized. The amount of oxidizing agent should not be such that after the oxidizing there is present an appreciable quantity of the oxidizing agent, however, when an excess amount of the oxidizing agent is employed, the excess oxidizing agent is usually removed prior to compositing with the alumina. When a nitrate ion, from nitric acid or a nitrate salt, is the oxidizing agent selected, the amount used is from about 0.1% to about 5.0% by weight of the platinum in the solution, and preferably from about 0.3% to about 1.5% by weight of the platinum in the solution. These percents are the weight percent of the nitrate ion.

The exact manner in which the oxidizing agent aids in the impregnation is not known, however, it appears that certain platinum compounds such as, for example, chloroplatinic acid, contain appreciable quantities of platinum in a reduced state, that is as chloroplatinous acid, and that the chloroplatinous acid is not as effective for preparing the catalyst as chloroplatinic acid. It appears that the effective catalyst is an association of platinum and alumina, and further, the platinum when composited with the alumina must be in such an oxidized state that it is able to enter into this close chemical combination or physical association with the alumina. In any event, when the platinum compound is oxidized prior to being composited with the alumina, the catalyst shows unexpected advantages. The oxidizing agent may be added to a concentrated solution of chloroplatinic acid which is subsequently diluted prior to compositing with the alumina or the oxidizing agent may be added to the dilute solution that is used for commingling with the alumina. The oxidizing changes the oxidation state of the platinum and thus the process of this invention is different from oxidizing platinum sulfide to platinum oxide since the sulfide and oxide are entirely different compounds and the oxidation is for the purpose of forming a new compound and not changing the oxidation state of the platinum.

The product from the oxidizing is now ready for compositing with the alumina or the alumina-containing composite such as alumina-silica. As hereinbefore set forth, one method of compositing this material with the alumina is to commingle it in the wet state with the wet alumina. The product is then dried and formed into particles of definite size and shape and calcined. In another embodiment the resultant product is composited with preformed and dried alumina pills.

The halogen may be incorporated into the catalyst composite in any manner and at any suitable time. In one embodiment the halogen may be composited with the alumina while the latter is either in a wet or dry state, and then the platinum is composited therewith, or the halogen may be composited with the alumina after the platinum has been composited therewith. The halogen conveniently is introduced as a solution of the hydrogen halide as, for example, an aqueous solution of hydrogen fluoride, an aqueous solution of hydrogen chloride, etc.

Regardless of when the material is to be formed into particles of definite size and shape, this is readily accomplished by partially drying at a temperature of from about 200° F. to about 500° F. for a period of from about 2 to 24 hours or more to form a cake. The cake may be ground into particles of irregular size and shape and then calcined at a temperature of from about 800° F. to about 1400° F. for a period of from about 1 to about 8 hours or more. When the material is to be formed into particles of uniform size and shape, the partially dried cake is ground, a suitable lubricant such as stearic acid, rosin, hydrogenated coconut oil, graphite, etc. is added, and the material is formed into pills of uniform size and shape in any suitable pelleting, extrusion or other apparatus.

Regarding the calcination temperatures, when the alumina or alumina-containing composite such as alumina-silica is formed into particles prior to the addition of the platinum, the particles preferably are calcined in air at a temperature of about 800° F. to about 1400° F. or more for a period of from about one to eight hours or more. However, after the platinum has been composited with the alumina, the catalyst should not be calcined at a temperature above about 1200° F. and preferably is calcined in air at a temperature of from about 500° F. to about 1200° F. for a period of from about two to twelve hours or more. In one embodiment of the invention the catalyst may be reduced in the presence of hydrogen at a temperature within this range and then calcined in the presence of air at similar temperatures, or the reverse procedure may be employed.

It is a particular feature of the present invention that the catalyst will form very low carbon deposits and, therefore, that the catalyst will have an unusually long life. However, after long periods of service, it may be necessary to regenerate the catalyst, and this may be accomplished by treating with air or other oxygen-containing gas to burn the carbonaceous deposit therefrom. In general, it is preferred to control the regeneration temperature not to exceed about 1200° F. and preferably the regeneration is effected at a temperature within the range of from about 600° F. to about 1100° F.

The conditions of operation for effecting the conversion of organic compounds will depend upon the particular reaction desired. Reforming of gasoline will be effected at a temperature of from about 600° F. to about 1000° F., a pressure within the range of from about 50 to about 1000 pounds per square inch or more and a weight hourly space velocity of from about 0.5 to about 20. The weight hourly space velocity is defined as the weight of oil per hour per weight of catalyst in the reaction zone. The reforming operation is preferably effected in the presence of hydrogen and the amount of hydrogen present in the reaction zone generally will be within the range of from about 0.5 to 20 mols of hydrogen or more per mol of hydrocarbon. The reforming process will be operated under conditions to produce hydrogen so that the hydrogen so produced may be recycled within the process and thus obviate the necessity of introducing hydrogen from an extraneous source except at the start of the process. It is understood that the reforming process is applicable to the treatment of a full boiling range gasoline or any selected fraction thereof, and that reference to gasoline in the present specifications and claim is intended to mean either the full boiling range gasoline or any selected fraction thereof.

In another embodiment the present catalysts are particularly useful in a combination reforming process in which the gasoline is subjected to treatment with the catalyst of the present invention in order to effect primarily aromatization reactions with a minimum of hydrocracking, and the product, either with or without intervening heating or increase in pressure, is subjected to treatment with a hydrocracking catalyst in order to obtain the desired selected or controlled cracking of the gasoline and thereby further improve its anti-knock characteristics. Suitable catalysts for the hydrocracking reaction include those containing the catalyst composite of the present invention together with a hydrocracking component such as a halogen and particularly fluorine, silica in combination with the alumina, with or without a halogen, or alumina with other components which induce mild cracking. This multiple stage operation has the advantage that the amount of carbon formed during the aromatization reaction is kept at a minimum and also that each of these reactions is effected under optimum conditions. The hydrocracking reaction is favored at lower temperatures and higher pressures as compared to the aromatization reaction.

While these conditions will vary with the particular charging stock, catalyst, etc., a suitable process may comprise one in which the aromatization reaction is effected at a temperature of from about 800° F. to about 1100° F., a pressure of from about 50 to about 700 pounds per square inch, a weight hourly space velocity of from about 2 to about 20 and a hydrogen to hydrocarbon ratio of from about 1 to about 6 mols of hydrogen per mol of hydrocarbon. The hydrocracking is effected at a temperature of from about 600° F. to about 1000° F., a pressure of from 500 to about 1000 pounds or more, a weight hourly space velocity of from about 0.2 to about 5, and a hydrogen to hydrocarbon ratio of from about 2 to about 10 mols of hydrogen per mol of hydrocarbon.

As hereinbefore set forth, the catalyst of the present invention is also particularly suitable for use in dehydrogenation reactions and these are generally effected at temperatures of from about 800° F. to about 1200° F. The catalyst is also particularly suitable for use in effecting hydrogenation reactions which generally are effected at temperatures of from about 200° F. to about 500° F. or slightly higher.

The process of the present invention may be effected in any suitable equipment. A particularly suitable process comprises a fixed system in which the catalyst is disposed in a reaction zone and the hydrocarbons to be treated are passed therethrough in either upward or downward flow. The products are fractionated to separate hydrogen and to recover the desired products. As hereinbefore set forth, the hydrogen is preferably recycled for further use in the process. Other suitable units in which the process may be effected include the fluidized type process in which the reactants and catalyst are maintained in a state of turbulence under hindered settling conditions in a reaction zone, the compact moving bed process in which the catalyst and hydrocarbons are passed either countercurrently or concurrently to each other, the suspensoid process in which the catalyst is carried into the reaction zone as a slurry in the reactants, the fluidized-fixed bed process in which the reaction is effected under hindered settling conditions in the reaction zone, but the catalyst does not leave the reaction zone as in the fluidized type process, etc. In the combination process hereinbefore set forth, two or more of such zones are preferably employed.

The following example is introduced to illustrate further the novelty and utility of the present invention but not with the intension of unduly limiting the same.

*Example*

An alumina sol was prepared by digesting aluminum metal in a dilute hydrochloric acid solution at an elevated temperature. The resultant sol contained about 28% $Al_2O_3$. A hexamethylene tetramine solution was prepared by adding 291 grams of hexamethylene tetramine to form one liter of solution. The sol and solution were passed, each at an equal rate, into a mixer. The mixture was then passed through a nozzle and into a forming chamber filled with Nujol. The forming chamber was maintained at a temperautre of 195° F. The droplets assumed substantially spherical shape during passage through the Nujol and were removed from the lower portion of the forming chamber by means of a stream of Nujol maintained at a temperautre of 195° F. The Nujol stream containing the spheres was passed into another zone in which a level of Nujol was maintained. The spheres were aged in Nujol, the oil drained therefrom and the spheres were then aged in an ammonium hydroxide solution and were subsequently washed with water.

A 4.8% aqueous solution of hydrogen fluoride was added in an amount to produce a final catalyst containing 0.45% combined fluorine by weight. The spheres were then further washed with water. The washed spheres were then partially dried at a temperature of 248° F. and calcined thereafter at a temperature of 1200° F. for three hours.

Two samples of approximately 410 pounds each of the calcined base were taken. One sample portion was impregnated with about 90 gallons of an 0.2% by weight of an aqueous solution of chloroplatinic acid. The mixture was evaporated to dryness and the spheres were then calcined in air at a temperature of about 932° F. for three hours. The chloroplatinic acid used for impregnating the second batch of catalyst was treated as follows prior to impregnation. 3000 cc. of an aqueous chloroplatinic acid solution containing 687.68 grams of platinum was treated with an oxidizing solution comprising 2 cc. of concentrated commercial hydrochloric acid and 50 cc. of a 30 percent by weight of hydrogen peroxide solution. This solution was then diluted with water to 90 gallons. The chloroplatinic acid solution after this oxidation and dilution was used to impregnate the catalyst, and the spheres were then dried and calcined at the same conditions as the first batch. After the calcination, the first sample portion of the spheres were of various coloration, that is, some of the spheres were a creamy white while others were a dark, almost black, color. This indicates a variation in the amount of platinum on the spheres when one sphere is compared to another. The second sample portion after the impregnation and calcination was of an even coloration which indicated uniform impregnation. It is thus seen that oxidation of the platinum-containing solution prior to impregnation produces a superior catalyst in which the platinum is uniformly distributed throughout the catalyst mass.

I claim as my invention:

A method of preparing a platinized alumina catalyst in which the platinum component is derived from an aqueous chloroplatinic acid solution containing an appreciable amount of chloroplatinous acid, which comprises commingling with said solution an amount of oxidizing agent not substantially in excess of that required to oxidize said chloroplatinous acid and oxidizing the latter with said agent, said oxidizing agent comprising a mixture of hydrochloric acid and hydrogen peroxide, thereafter compositing the thus treated solution with alumina in an amount to form a final catalyst containing from about 0.01% to about 10% by weight of platinum, and calcining the resultant composite at a temperature of from about 500° F. to about 1200° F.

References Cited in the file of this patent

UNITED STATES PATENTS

| | | |
|---|---|---|
| 2,154,451 | Hull | Apr. 18, 1939 |
| 2,207,868 | Martin | July 16, 1940 |
| 2,566,521 | Haensel | Sept. 4, 1951 |
| 2,636,863 | Haensel | Apr. 28, 1953 |